United States Patent Office
3,050,506
Patented Aug. 21, 1962

3,050,506
QUATERNIZATION OF VINYL CHLORO-
ACETATE POLYMERS
David R. Sexsmith, Stamford, Conn., assignor to American Cyanamid Company, New York, N.Y., a corporation of Maine
No Drawing. Filed Apr. 22, 1960, Ser. No. 23,921
6 Claims. (Cl. 260—85.7)

The present invention relates to water-soluble hydrophobic-hydrophilic vinyl quaternary ammonium copolymers. More particularly, the invention relates to a process for the manufacture of such copolymers by quaternization of a chlorine containing vinyl copolymer with a liquid pyridine in the absence of solvent.

In the past, discovery has been made that the hydrophobic-hydrophilic vinyl higher fatty acid ester-vinyl chloroacetate copolymers possess valuable properties when quaternized with a pyridine. Thus the products formed by reacting the copolymer of 1 to 1.5 mols of a vinyl higher fatty acid ester [for example vinyl stearate

with 1.5 to 1 mol of vinyl chloroacetate

followed by quaternization with pyridine to render the copolymer hydrophilic, are valuable sizing agents for use in the manufacture of paper. The materials are cationic and are rapidly adsorbed by cellulose papermaking fibers in dilute aqueous suspension and render the fibers resistant to penetration by water.

In the past, the quaternization step has been effected by dissolving the starting vinyl fatty ester-vinyl chloroacetate copolymer (which is a solid at room temperature) in a solvent for example, dioxane, adding pyridine in desired amount, refluxing the solution until substantially all of the pyridine has reacted, and stripping off the dioxane and any unreacted pyridine. The reaction under these conditions requires about six hours and has the additional disadvantage of requiring the use and reuse of a volatile inflammable solvent.

The discovery has now been made that the pyridines which melt below 200° C. react with the copolymer when it is in molten form and that the presence of solvent is unnecessary. We have demonstrated that the reaction of the pyridine with the copolymer proceeds when the two are at a temperature above their separate solidification points and that the reaction goes to substantial completion without harm to the starting copolymer in less than 30 and often in less than 15 minutes at preferred temperatures below the decomposition point of the copolymer which is about 200° C. According to the invention, therefore, the copolymer is mixed with up to one equivalent of a pyridine which is liquid at a temperature below 200° C. and the reaction mixture is maintained at a temperature above the melting point of the copolymer and the pyridine (if the latter is normally solid) and the boiling point of the pyridine or 200° C., whichever is lower, until reaction of the copolymer with the pyridine is substantially complete, i.e., until at least 80% of the pyridine (not including any predetermined excess) has reacted.

Increasing the temperature of the reaction increases its speed. The pyridine may be added to the cold (solid) polymer, to the polymer as soon as it has melted, or to the molten polymer at more elevated temperatures, as may be the most convenient. Preferably the reaction mixture is maintained at atmospheric pressure roughly 20° C. below the boiling point of the pyridine as this permits the reaction to proceed at maximum practical velocity while avoiding need for an autoclave and minimizing loss of the pyridine used.

The invention is applicable to quaternizations employing pyridine, 2-picoline, 2,4-lutidine, 2,4,6-collidine and quinoline. These pyridines are normally liquid. In addition, the invention is applicable to quaternizations effected by use of higher melting pyridines including isoquinoline, 3-benzylpyridine and 4-phenylpyridine. These pyridines are normally solid but are liquid below about 200° C., which permits quaternization to be effected below the decomposition temperature of the starting copolymers.

The invention permits the reaction of one equivalent of the pyridine, based on the combined vinyl chloroacetate present. The reaction of a smaller amount is within the scope of the invention. It is also within the scope of the invention to accelerate the reaction by adding the pyridine in excess, in which case the unreacted pyridine may be recovered in any convenient way if desired.

The invention will be more particularly illustrated by reference to the examples. These examples are specific embodiments of the invention and are not to be construed as limitations thereof.

*Example 1*

Into a round-bottomed flask equipped with a thermometer, nitrogen gas inlet tube and stirrer are placed 431 grams of a 1:1 molar ratio vinyl stearate-vinyl chloroacetate copolymer. The flask is placed on a steam bath and flow of nitrogen is started. The polymer melts over the range of about 40°–50° C. As the temperature rises 79 grams (1 mol) of pyridine are run in; the temperature is allowed to reach 90° C. in 5 minutes and is held there for 25 minutes.

The contents of the reaction vessel are cooled and the polymer is ground up. Analysis shows that 94.7% of the pyridine reacts.

The polymer is dissolved in isopropanol and diluted to 1% with water. A cloudy colloidal solution is obtained.

An aqueous suspension of papermaking fibers is prepared at 0.6% consistency and a pH of 7.5 and to this is added the above colloidal solution in amount sufficient to provide 0.5% of the polymer on the dry weight of the fibers. The suspension is sheeted and the handsheets are dried at 200° F. for 1 minute. They are well sized.

*Example 2*

The procedure of Example 1 is repeated using 93 grams (1 mol) of 2-picoline in place of the pyridine. The reaction proceeds in the same way with similar results.

*Example 3*

The procedure of Example 1 is repeated using 129 grams (1 mol) of quinoline in place of the pyridine. The reaction proceeds in the same way with similar results.

I claim:
1. A process for the reaction of a 1.5:1 to 1:1.5 molar ratio hydrophobic vinyl higher fatty acid ester-vinyl chloroacetate copolymer with a liquid pyridine, which consists essentially in mixing said copolymer with up to one equivalent of a pyridine which is liquid at a temperature below 200° C., and maintaining said mixture at a temperature between the melting points of said copolymer and said pyridine and the boiling point of said pyridine until the reaction of said pyridine with said copolymer is substantially complete.

2. A process according to claim 1 wherein the vinyl fatty acid ester is vinyl stearate.

3. A process according to claim 1 wherein the pyridine is pyridine.

4. A process according to claim 1 wherein the pyridine is 2-picoline.

5. A process according to claim 1 wherein the temperature of the copolymer is above its melting point during addition of the pyridine.

6. A process according to claim 1 wherein the mixture is maintained at atmospheric pressure at a temperature 20° C. below the boiling point of the pyridine.

References Cited in the file of this patent

UNITED STATES PATENTS 2,118,864   Reppe et al. _____ May 31, 1938

FOREIGN PATENTS 697,503   Great Britain _____ Sept. 23, 1953